(12) United States Patent
Lim et al.

(10) Patent No.: US 10,454,365 B2
(45) Date of Patent: Oct. 22, 2019

(54) APPARATUS AND METHOD FOR CONTROLLING PULSE WIDTH MODULATION SWITCHING FREQUENCY

(71) Applicant: HYUNDAI AUTRON CO., LTD., Seongnam-si (KR)

(72) Inventors: Dong-Hwi Lim, Seoul (KR); Woo-Seok Shim, Yongin-si (KR); Hyun-Doo Hwang, Seoul (KR)

(73) Assignee: Hyundai Autron Co., Ltd., Seoul (KR)

( * ) Notice: Subject to any disclaimer, the term of this patent is extended or adjusted under 35 U.S.C. 154(b) by 0 days.

(21) Appl. No.: 15/836,883

(22) Filed: Dec. 10, 2017

(65) Prior Publication Data

US 2018/0166978 A1 Jun. 14, 2018

(30) Foreign Application Priority Data

Dec. 9, 2016 (KR) .......................... 10-2016-0167845

(51) Int. Cl.
*H02M 1/42* (2007.01)
*H02M 1/08* (2006.01)
(Continued)

(52) U.S. Cl.
CPC ........... *H02M 1/4233* (2013.01); *H02M 1/08* (2013.01); *H02M 1/4225* (2013.01);
(Continued)

(58) Field of Classification Search
CPC ............ H02M 3/3384; H02M 3/3388; H02M 3/3382; H02M 3/3378; H02M 3/3372;
(Continued)

(56) References Cited

U.S. PATENT DOCUMENTS 6,191,676 B1 * 2/2001 Gabor ................. H02M 1/4225
336/160
7,719,248 B1 * 5/2010 Melanson ........... H02M 1/4225
323/222

(Continued)

FOREIGN PATENT DOCUMENTS

JP  5649158 B2  1/2015
KR  101113956 B1  3/2012

*Primary Examiner* — Jue Zhang
*Assistant Examiner* — Kevin H Sprenger
(74) *Attorney, Agent, or Firm* — Baker & Hostetler LLP; Hyunho Park (57) ABSTRACT

Disclosed herein are an apparatus and a method for controlling PWM switching frequency that employ a negate PWM scheme to thereby increase PWM switching frequency, improve control responsiveness, and reduce the size of the circuit. The apparatus includes: a power factor correction (PFC) converter configured to convert an AC voltage into a DC voltage, the converter comprising a transistor controlling an operation of the PFC converter and a current sensor for measuring an electric current flowing through the transistor; and a controller configured to receive an output from the current sensor and calculate a duty ratio of a switching signal applied to a gate terminal of the transistor. The controller applies the calculated duty ratio to the switching signal in an on-duty period of the switching signal.

11 Claims, 11 Drawing Sheets

(51) Int. Cl.
*H02M 3/335* (2006.01)
*H02M 7/06* (2006.01)
*H02M 3/337* (2006.01)
*H02M 1/00* (2006.01)

(52) U.S. Cl.
CPC ..... *H02M 3/3376* (2013.01); *H02M 3/33538* (2013.01); *H02M 3/33569* (2013.01); *H02M 7/06* (2013.01); *H02M 2001/007* (2013.01); *H02M 2001/0009* (2013.01); *H02M 2001/0012* (2013.01); *H02M 2001/0025* (2013.01); *H02M 2001/0058* (2013.01); *Y02B 70/126* (2013.01); *Y02B 70/1491* (2013.01)

(58) Field of Classification Search
CPC ...... H02M 3/337; H02M 3/3376; H02M 3/28; H02M 3/33569; H02M 3/156; H02M 3/00; H02M 3/33507; H02M 3/33523; H02M 3/33592; H02M 3/135; H02M 3/137; H02M 3/10; H02M 3/157; H02M 3/1584; H02M 7/53835; H02M 7/53846; H02M 7/53862; H02M 7/53806; H02M 7/53871; H02M 7/493; H02M 7/575; H02M 7/525; H02M 7/219; H02M 7/12; H02M 7/217; H02M 7/7575; H02M 7/06; H02M 7/068; H02M 7/10; H02M 7/537; H02M 7/003; H02M 7/5387; H02M 7/538; H02M 7/5381; H02M 1/4208; H02M 1/4225; H02M 1/06; H02M 1/32; H02M 5/4585; Y02B 70/1433; Y02B 70/126; Y02B 70/1475; Y02B 70/1441; G05F 1/33; G05F 1/38; G05F 1/32; G05F 1/34
USPC ... 363/22–26, 78–82, 89, 123–127, 131–134
See application file for complete search history.

(56) References Cited

U.S. PATENT DOCUMENTS

| | | | | |
|---|---|---|---|---|
| 8,288,954 | B2* | 10/2012 | Melanson | H02M 3/33523 315/206 |
| 2002/0188383 | A1* | 12/2002 | Elek | H02M 1/34 700/297 |
| 2008/0272744 | A1* | 11/2008 | Melanson | H02M 1/4225 323/205 |
| 2013/0307340 | A1* | 11/2013 | Subramanium | H02J 3/38 307/72 |
| 2015/0365003 | A1* | 12/2015 | Sadwick | H02M 3/28 363/21.01 |

* cited by examiner

APPARATUS AND METHOD FOR CONTROLLING PULSE WIDTH MODULATION SWITCHING FREQUENCY

CROSS-REFERENCE TO RELATED APPLICATIONS

This application claims the priority of Korean Patent Application No. 10-2016-0167845 filed on Dec. 9, 2016, in the Korean Intellectual Property Office, the disclosure of which is hereby incorporated by reference in its entirety.

BACKGROUND

1. Technical Field

The present disclosure relates to an apparatus and a method for controlling PWM switching frequency. More specifically, the present disclosure relates to an apparatus and a method for controlling PWM switching frequency that employ a negate PWM scheme to thereby increase PWM switching frequency, improve control responsiveness, and reduce the size of the circuit.

2. Description of the Related Art

Recently, the capacity of the battery is ever increasing to extend the range of green vehicles. The capacity of the on board charger (OBC) for charging the battery is also increasing. As a result, the size and price of OBC controllers are increasing.

There are a variety of approaches to reduce the size and price of the OBC controllers. Among them, there is an approach to develop a current transformer sensor that can replace a hall sensor employed in an OBC controller as a current sensor so as to reduce the cost.

Typically, in order to reduce the size of a power factor corrector (PFC) converter used in an apparatus for controlling PWM switching frequency, it may be contemplated to increase the PWM switching frequency. That is, a high-speed switching control method may be used to reduce the size of the PFC converter.

However, to increase the PWM switching frequency, it is required to complete the control operation within a control cycle. Unfortunately, there is only so much that the time required for the control operation can be reduced in the controller that controls the PFC converter. Accordingly, it is difficult to achieve a high-speed switching frequency.

In addition, it may be also contemplated to modulate the duty ratio of the PWM switching signal in order to achieve a system with high control responsiveness. However, it is difficult to regulate the timing of the ADC sensing.

SUMMARY

It is an object of the present disclosure to provide an apparatus and a method for controlling PWM switching frequency that can increase PWM switching frequency by employing a negate PWM scheme in which a duty ratio of a switching signal for controlling a PFC converter is calculated by using a current sensor included in the PFC converter, and the calculated duty ratio is updated in on-duty period of the switching signal.

It is another object of the present disclosure to provide an apparatus and a method for controlling PWM switching frequency that can increase PWM switching frequency effectively by adjusting timing of ADC sensing depending on a variation in the duty ratio of the switching signal for controlling the PFC converter.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an apparatus for controlling PWM switching signal includes: a power factor correction (PFC) converter configured to convert an AC voltage into a DC voltage, the converter comprising a transistor controlling an operation of the PFC converter and a current sensor for measuring an electric current flowing through the transistor; and a controller configured to receive an output from the current sensor and calculate a duty ratio of a switching signal applied to a gate terminal of the transistor. The controller applies the calculated duty ratio to the switching signal in an on-duty period of the switching signal.

The PFC converter may include a rectifier stage to rectify an AC voltage by using a plurality of diodes; and a control circuit comprising a first capacitor connected in parallel to the rectifier stage, and an inductor connected in series to one side of the capacitor, a diode and a second capacitor, wherein one end of the transistor is connected between the inductor and the diode, and another end of the transistor is connected to the se capacitor.

The apparatus may further include: a DC-DC converter controlled by the controller, the DC-DC converter comprising a transformer for stepping up/down an output voltage applied to the second capacitor to output it to a secondary side.

The magnitude of a current measured by the current sensor may increase in the on-duty ratio period of the switching signal.

The controller may receive an analog current value measured by the current sensor in the on-duty period, converts the analog current value into a digital signal to then calculate a variation of the duty ratio of the switching signal applied to the transistor based on the converted digital signal, and update the switching signal by reflecting the variation of the duty ratio in the on-duty period of the switching signal, to thereby control timing of measuring the current by the current sensor.

The controller may include a duty ratio of a first cycle with a duty ratio of a second cycle subsequent to the first cycle of the switching signal, and retard the timing of measuring the current by the current sensor if the duty ratio of the first cycle is smaller than the duty ratio of the second cycle.

The controller may advance the timing of measuring the current by the current sensor if the duty ratio of the first cycle is greater than the duty ratio of the second cycle.

In accordance with another aspect of the present disclosure, a method for controlling PWM switching frequency includes: measuring an electric current flowing through a transistor for controlling an operation of a PFC converter; receiving data on the measured current to calculate a duty ratio of a switching signal applied to a gate terminal of the transistor based on the data; and applying the calculated duty ratio to the switching signal in an on-duty period of the switching signal.

The PFC converter may include a rectifier stage to rectify an AC voltage by using a plurality of diodes; and a control circuit comprising a first capacitor connected in parallel to the rectifier stage, and an inductor connected in series to one side of the capacitor, a diode and a second capacitor, wherein one end of the transistor is connected between the inductor and the diode, and another end of the transistor is connected to the se capacitor.

The magnitude of a current measured by the current sensor may increase in the on-duty ratio period of the switching signal.

The receiving data on the measured current to calculate a duty ratio of a switching signal applied to a gate terminal of the transistor based on the data may include: receiving an analog current value measured by the current sensor in the on-duty period; converting the analog current value into a digital signal to then calculate a variation of the duty ratio of the switching signal applied to the transistor based on the converted digital signal; and determining a new duty ratio of the switching signal by reflecting the variation of the duty ratio in the on-duty period of the switching signal.

The method may further include comparing a duty ratio of a first cycle with a duty ratio of a second cycle subsequent to the first cycle of the switching signal; and retarding the timing of measuring the current by the current sensor if the duty ratio of the first cycle is smaller than the duty ratio of the second cycle.

The method may further include advancing the timing of measuring the current by the current sensor if the duty ratio of the first cycle is greater than the duty ratio of the second cycle.

According to an exemplary embodiment of the present disclosure, by updating the calculated duty ratio in an on-duty period of the switching signal according to the negate PWM scheme, it is possible to achieve high PWM switching frequency so that the capacity of the inductor and capacitor can be reduced, thereby reducing the overall area of the circuit.

In addition, according to an exemplary embodiment of the present disclosure, by achieving a high PWM frequency by efficiently utilizing a control operation time within the PWM switching frequency, it is possible to achieve a system having high control characteristics with high control responsiveness, thereby improving the system operation efficiency.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Hereinafter, an apparatus and a method for controlling PWM switching frequency according to the exemplary embodiments of the present disclosure will be described in detail with reference to the drawings.

Figure 1:
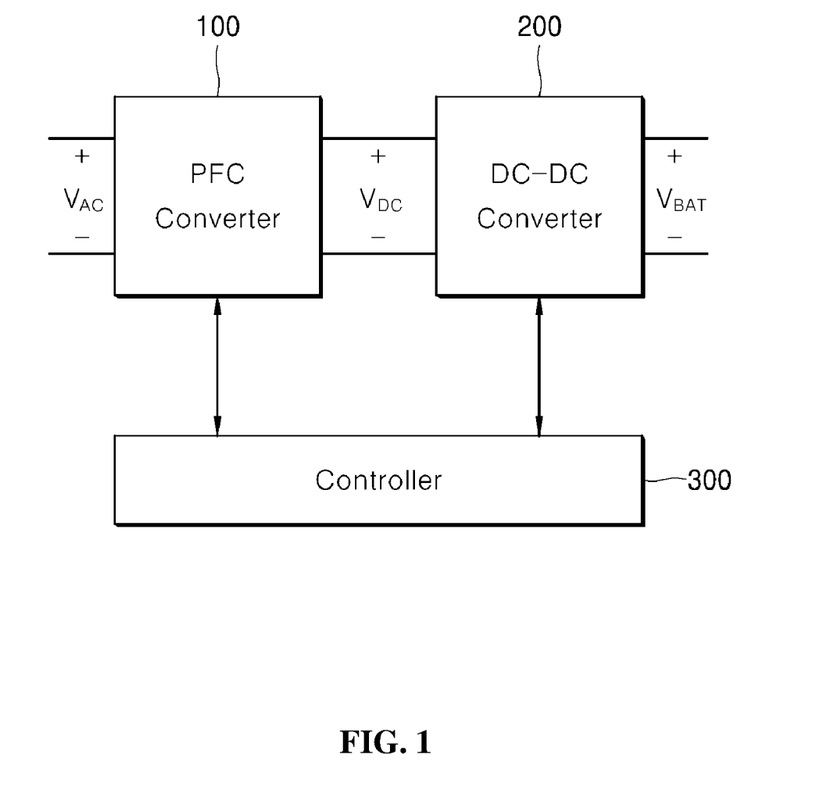
FIG. 1 is a block diagram illustrating an apparatus for controlling PWM switching frequency according to some exemplary embodiments of the present disclosure.
Figure 2:
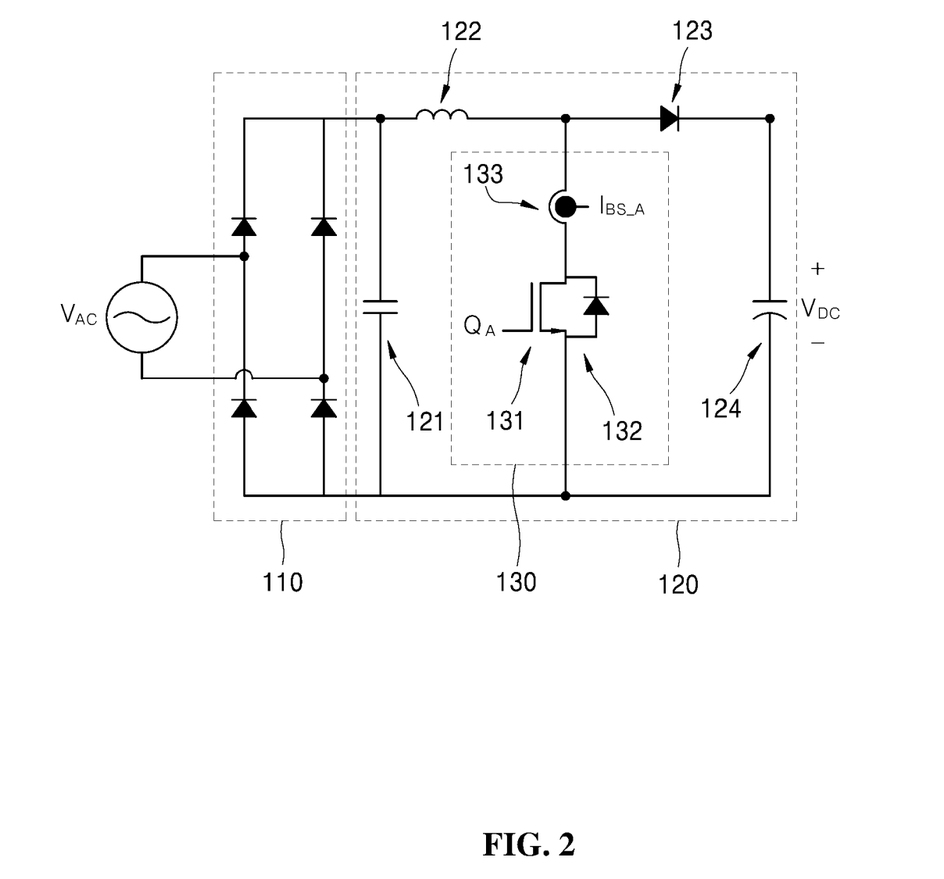
FIG. 2 is a circuit diagram showing elements of a PFC converter of FIG. 1.
Figure 3:
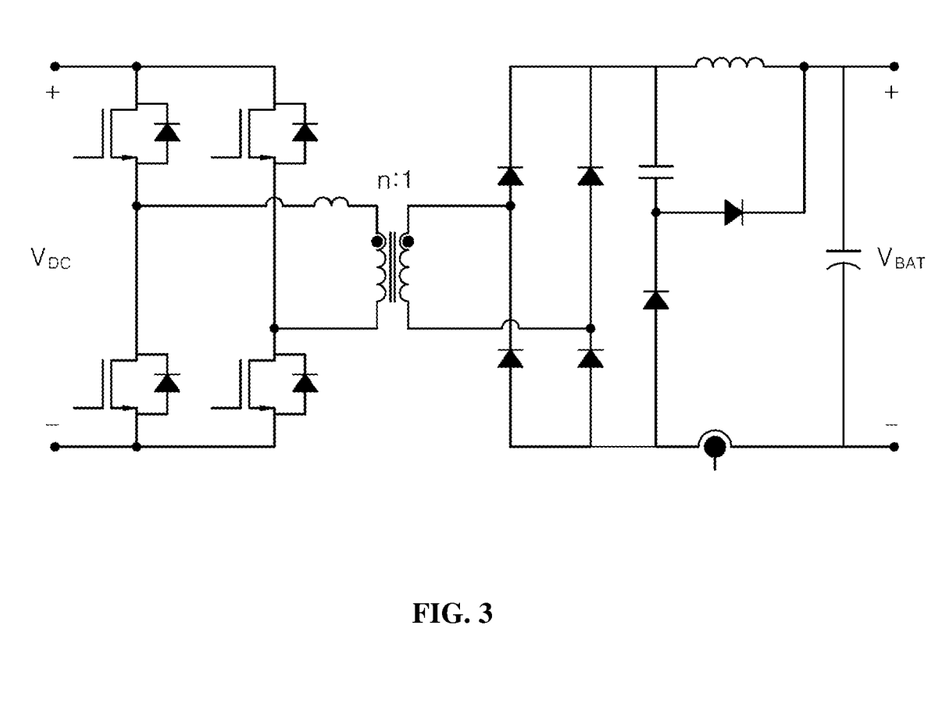
FIG. 3 is a circuit diagram showing elements of a voltage converter of FIG. 1.

FIG. 1 is a block diagram illustrating an apparatus for controlling PWM switching frequency according to some exemplary embodiments of the present disclosure. FIG. 2 is a circuit diagram showing elements of a PFC converter of FIG. 1. FIG. 3 is a circuit diagram showing elements of a DC-DC converter of FIG. 1.

Referring to FIG. 1, the apparatus for controlling PWM switching frequency according to some exemplary embodiments of the present disclosure includes a PFC converter 100, a DC-DC converter 200, and a controller 300.

Specifically, the PFC converter 100 converts an AC voltage $V_{AC}$ to a DC voltage $V_{DC}$. The PFC converter 100 includes a PFC (power factor correction) boost converter (hereinafter referred to as a PFC converter), which is an AC/DC converter capable of improving power factor.

The PFC converter 100 may be operated by receiving the mains electricity. For example, the PFC converter 100 may be operated with an input voltage in the range of approximately 90 to 265 Vrms, can improve power factor, and may output a voltage in the range of approximately 380 to 400 $V_{DC}$. It is to be understood that this is merely illustrative.

The elements of the PFC converter 100 will be described in detail with reference to FIG. 2. The PFC converter 100 of the apparatus for controlling PWM switching frequency according to some exemplary embodiments of the present disclosure includes a rectifier stage 110 and a control circuit 120.

The rectifier stage 110 rectifies an AC voltage by using a plurality of diodes that allows an electric current to flow only in one direction. For example, the rectifier stage 110 includes four diodes, and one end of an AC voltage source may be connected between two diodes connected in series. The voltage rectified at the rectifier stage 110 is applied to the control circuit 120.

The control circuit 120 includes a plurality of capacitors 121 and 124, an inductor 122, a diode 123, and a switch part 130.

The first capacitor 121 may be connected in parallel with the rectifier stage 110. The inductor 122, the diode 123 and the second capacitor 124 may be connected in series with one another. The diode 123 and the second capacitor 124 may be connected in parallel with the first capacitor 121.

One end of the switch part 130 may be connected between the inductor 122 and the diode 123, while the other end of the switch part 130 may be connected to one end of the second capacitor 124.

The switch part 130 includes a transistor 131 serving as a switch, a diode 132, and a current sensor 133.

One end of the transistor 131 is connected between the inductor 122 and the diode 123, while the other end of the transistor 131 is connected to the one end of the second capacitor 124. That is, the operation of the transistor 131 may be controlled by the controller 300.

The current sensor 133 may be disposed at a side of the transistor 131. The current sensor 133 may be connected in series with the transistor 131. By doing so, it is possible to magnetic flux saturation of the current sensor 133. The current sensor 133 may include a CT sensor.

The current sensor 133 can measure the current flowing in the transistor 131 when the transistor 131 is turned on. In addition, the current sensor 133 can measure the current flowing in the diode 132 connected in parallel with the transistor 131 when the transistor 131 is turned off.

The value of the current measured by the current sensor 133 is sent to the controller 300. The controller 300 may adjust the duty ratio of a switching signal $Q_A$ applied to the transistor 131 based on the measured value of the current.

Specifically, the controller 300 controls the operation of the transistor 131 by adjusting the duty ratio or the frequency of the switching signal $Q_A$. In this manner, the controller 300 can adjust the PWM switching frequency of the PFC converter 100. A more detailed description thereon will be given later.

Referring to FIGS. 1 and 3, the DC-DC converter 200 converts the DC voltage $V_{DC}$ output from the PFC converter 100 into a battery charging voltage $V_{BAT}$.

Specifically, the DC-DC converter 200 includes a transformer for stepping up/down the output voltage $V_{DC}$ applied to the capacitor 124 of the PFC converter 100 and outputting it to the secondary side. The operation of the DC-DC converter 200 is controlled by the controller 300.

For example, the DC-DC converter 200 may include a DC/DC converter of a phase shift full bridge (PSFB) type. In addition, the DC-DC converter 200 may include an isolation transformer for isolation, which may have a significant influence on the efficiency of the charger. It is to be understood that this is merely illustrative.

Referring back to FIG. 1, the controller 300 controls the operation of the PFC converter 100 and the DC-DC voltage converter 200. The controller 300 includes a microcontroller unit (MCU), a central processing unit (CPU), a microprocessor, and the like.

The controller 300 may control the operation of the transistors included in the PFC converter 100 or the DC-DC converter 200 using switching signals. Specifically, the controller 300 may change the PWM switching frequency of the PFC converter 100 and the DC-DC converter 200.

The controller 300 may receive the value of the current measured by the current sensor 133 included in the PFC converter 100 and may calculate the duty ratio of the switching signal $Q_A$ applied to the gate terminal of the transistor 131 that controls the operation of the PFC converter 100.

Subsequently, the controller 300 applies the calculated duty ratio to the switching signal $Q_A$ in an on-duty period of the switching signal $Q_A$. This PWM control manner by the controller 300 is referred to as a negative PWM scheme.

In this manner, the controller 300 can change the PWM switching frequency of the PFC converter 100.

In addition, by changing the PWM switching frequency of the PFC converter 100, it is possible to change the size of the PFC converter 100. Specifically, the major factor that determines the size of the PFC converter 100 is the capacity of the inductor and the capacitor included in the PFC converter 100. A higher PWM switching frequency allows for a lower capacity of the inductor and the capacitor. Accordingly, the size of the PFC converter 100 can be reduced by increasing the PWM switching frequency.

There are, however, several limitations in increasing the PWM switching frequency. This will be described later with reference to FIGS. 6 and 7.

Figure 4:
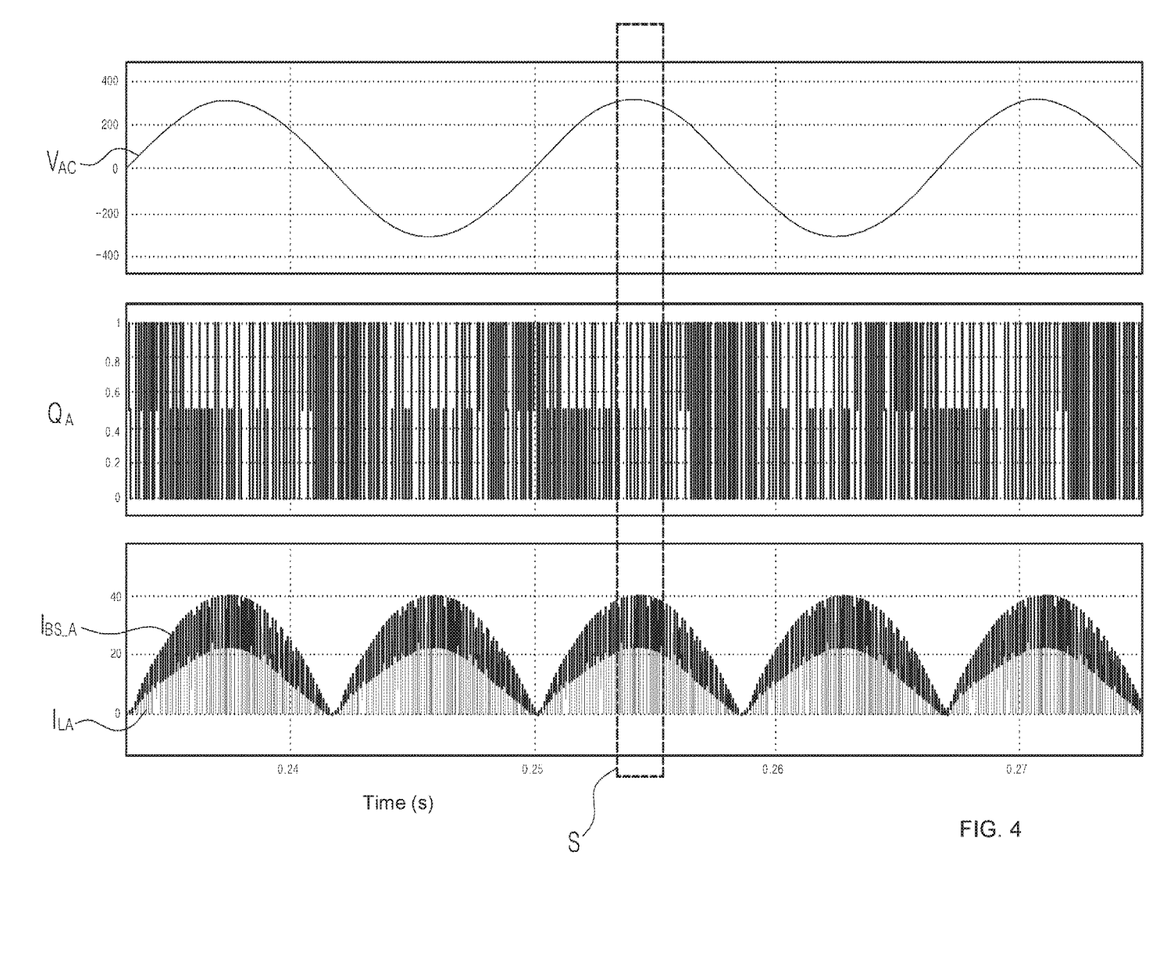
FIGS. 4 and 5 are graphs showing operation waveforms of the PFC converter of FIG. 1.
Figure 5:
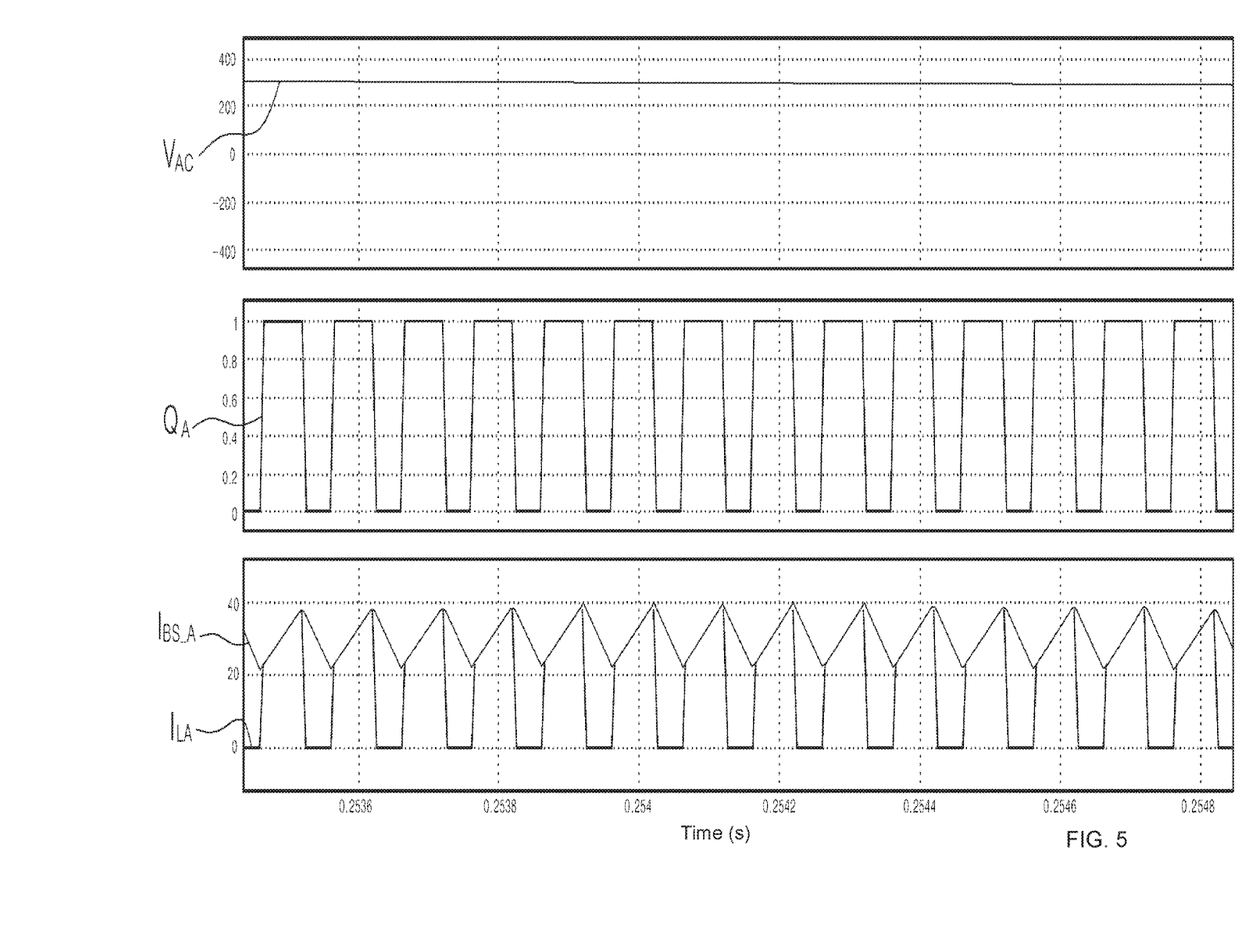

FIGS. 4 and 5 are graphs showing operation waveforms of the PFC converter of FIG. 1.

FIG. 4 shows an AC voltage $V_{AC}$ applied to the PFC converter 100, a switching signal $Q_A$ for controlling the transistor 131 included in the PFC converter 100, and a current value $I_{BS\_A}$ measured by the current sensor 133. The current value $I_{LA}$ below the current value $I_{BA\_A}$ denotes a current flowing in the inductor 122 of the PFC converter 100.

FIG. 5 is an enlarged view of portion S of the graph shown in FIG. 4.

Referring to FIG. 5, the switching signal $Q_A$ has a waveform of a constant cycle and has on-duty periods in which the switching signal $Q_A$ is activated and off-duty periods in which the switching signal $Q_A$ is inactive.

A current flows in the transistor 131 of the PFC converter 100 only in the on-duty period of the switching signal $Q_A$. A current flows in the diode 132 connected in parallel to the transistor 131 in the off-duty periods of the switching signal $Q_A$.

The current value $I_{BS\_A}$ measured by the current sensor 133 increases in the on-duty period. Then, the current value $I_{BS\_A}$ decreases in the off-duty periods.

Therefore, the current sensing by the current sensor 133 connected in series with the transistor 131 is effective only in the on-duty period. It is to be understood that this is merely illustrative.

Figure 6:
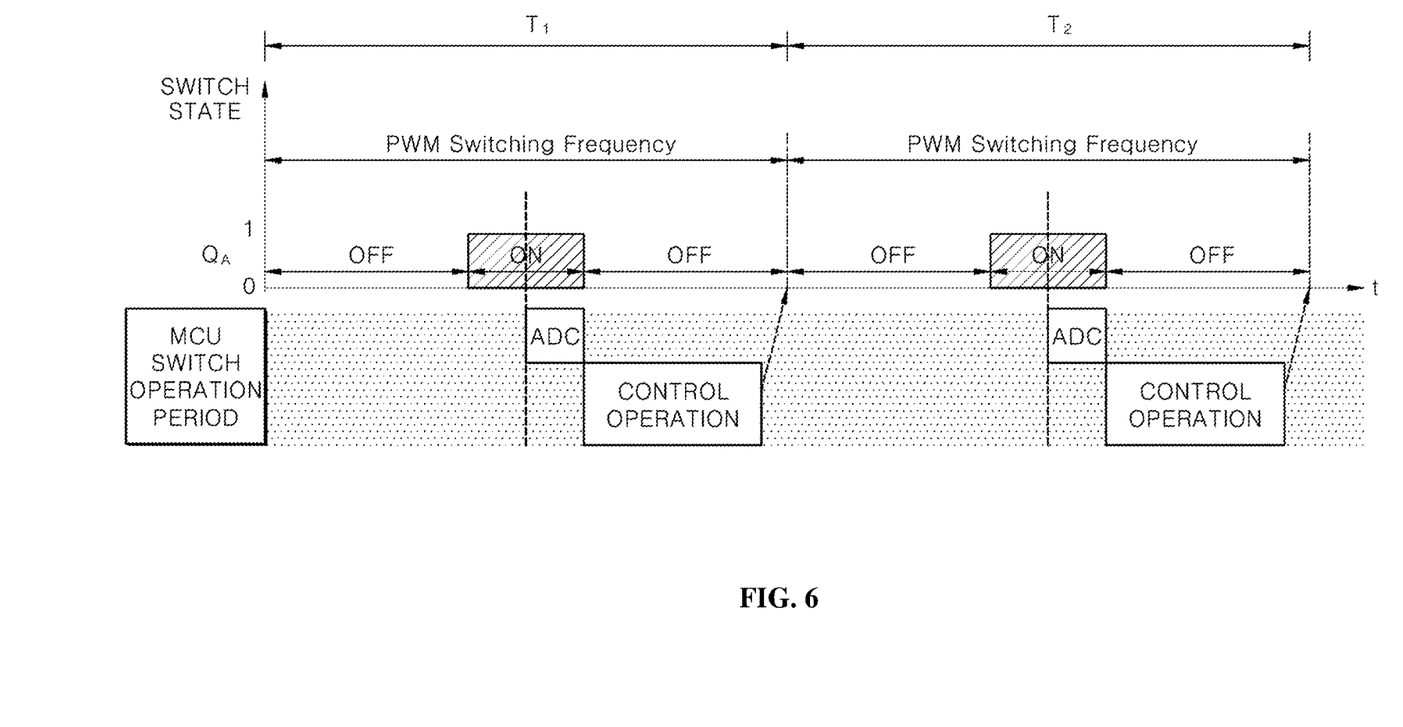
FIGS. 6 and 7 are timing charts for illustrating the operation of an existing apparatus for controlling PWM switching frequency.
Figure 7:
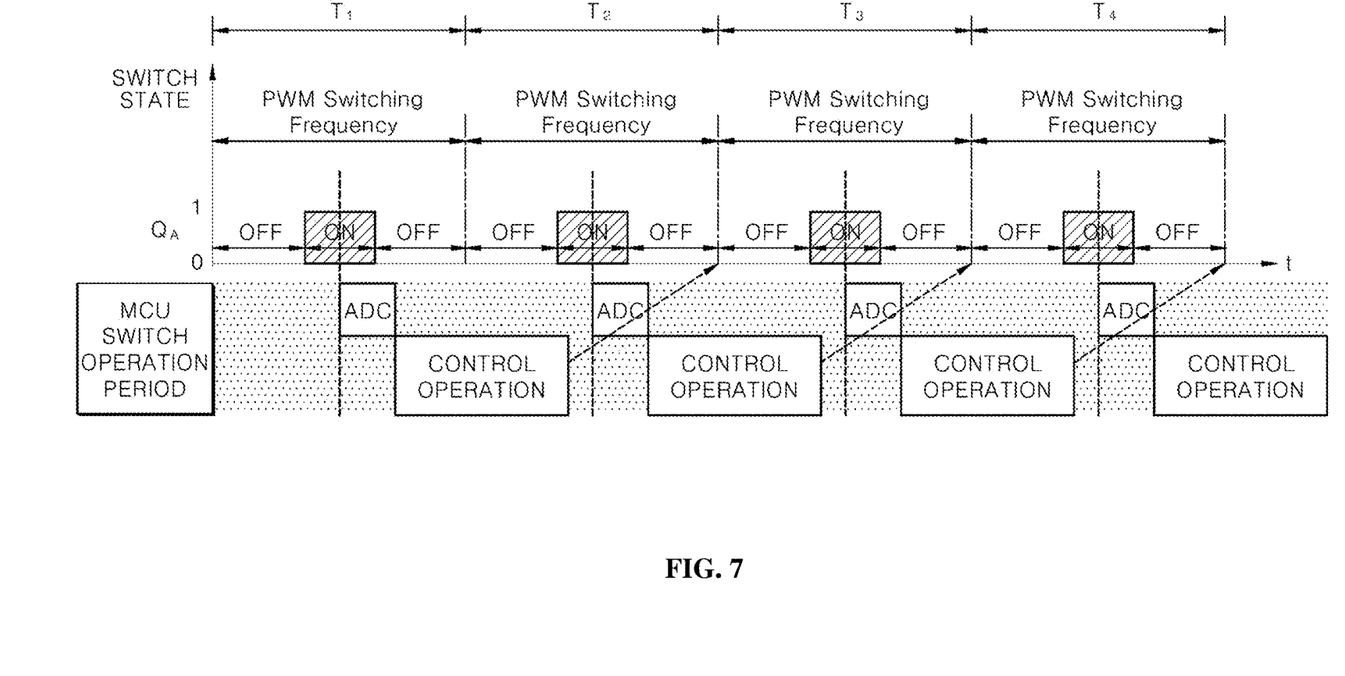

FIGS. 6 and 7 are timing charts for illustrating the operation of an existing apparatus for controlling PWM switching frequency.

Referring to FIG. 6, a switching signal $Q_A$ is applied to a transistor included in a PFC converter in the existing apparatus, like the apparatus according to the exemplary embodiment of the present disclosure.

Within a cycle of the switching signal $Q_A$, the current sensing is performed by a current sensor (e.g., a CT sensor) at the center of an on-duty period. The amount of current sensed by the sensing is input to a controller (e.g., a MCU) as a feedback signal.

Subsequently, the controller converts the received feedback signal using the ADC.

Subsequently, the controller performs a control operation for controlling the operation of the PFC converter based on the converted feedback signal.

The controller then reflects the result of the control operation on the switching signal $Q_A$ at the center of an off-duty period of the switching signal $Q_A$.

Hereinafter, problems of the existing apparatus for controlling PWM switching frequency will be described with reference to FIG. 7.

Referring to FIG. 7, current sensing by a current sensor (e.g., a CT sensor) is only possible during an on-duty period. Accordingly, the control operation of the PFC converter using the current sensor (e.g., a CT sensor) could utilize only the half of a control cycle for the control operation time.

Accordingly, there has been the problem in achieving a high-speed PWM switching frequency in that the control operation is not completed within the control period, such that the result of the operation of the control period is reflected after one cycle and thus the control responsiveness become poor.

That is, although such control scheme of a PFC converter can achieve a high-speed PWM switching frequency, it exhibits poor control responsiveness, such that the operation efficiency is lowered and the control reliability become poor. As a result, it is not practical.

Accordingly, in achieving a high-speed PWM switching frequency, there is a limit that the PWM switching frequency cannot be increased due to the control operation time.

Figure 8:
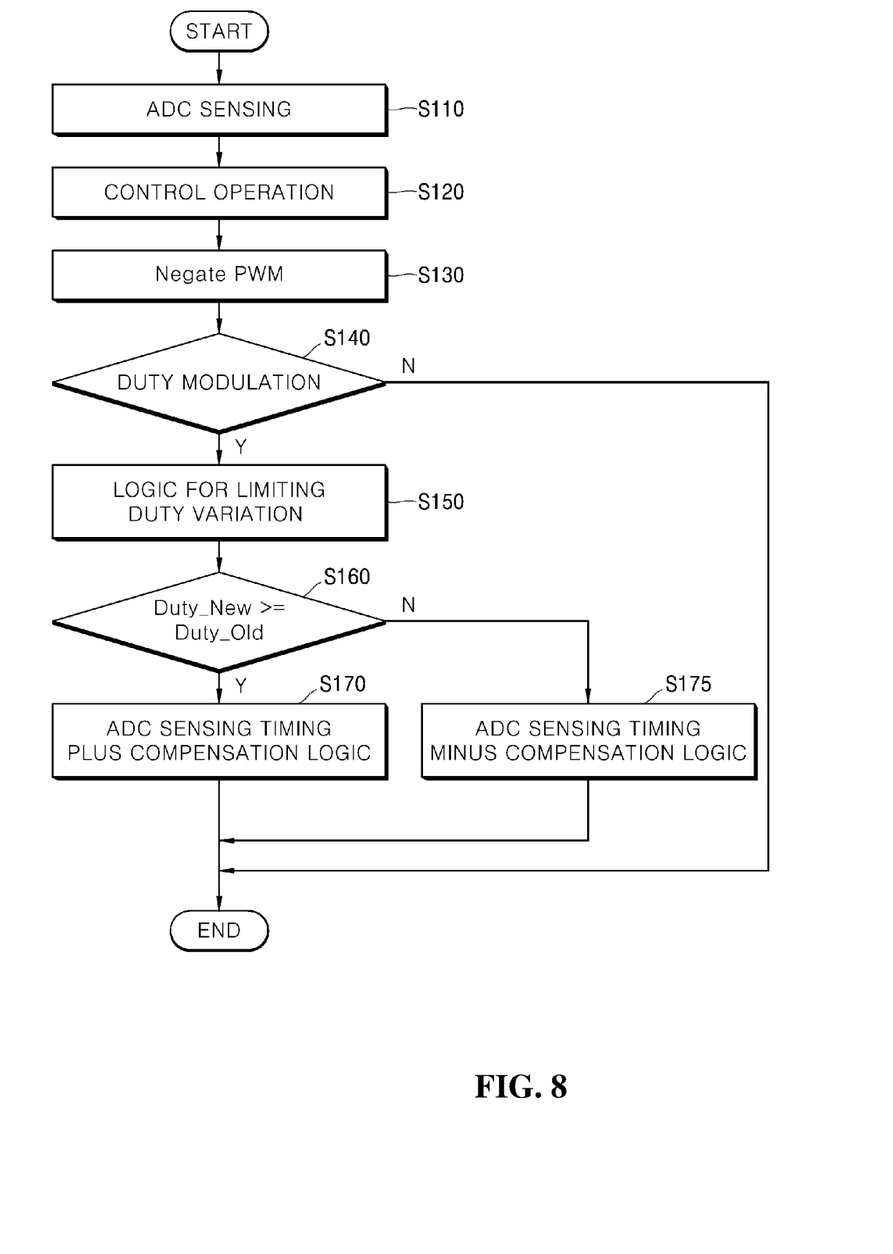
FIG. 8 is a flowchart illustrating a method for controlling PWM switching frequency according to some exemplary embodiments of the present disclosure.
Figure 9:
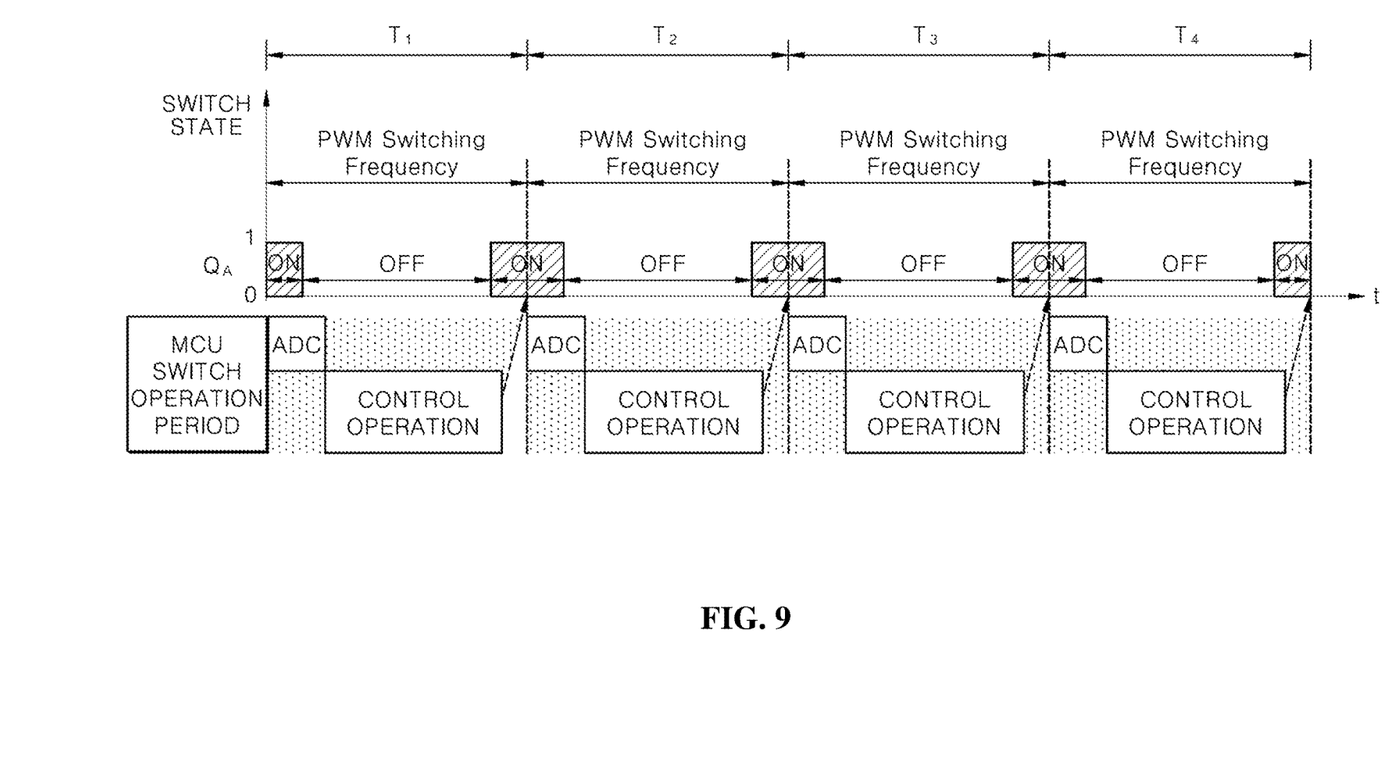
FIG. 9 is a timing chart for illustrating negate PWM operation of the apparatus and method for controlling PWM switching frequency of FIG. 8.
Figure 10:
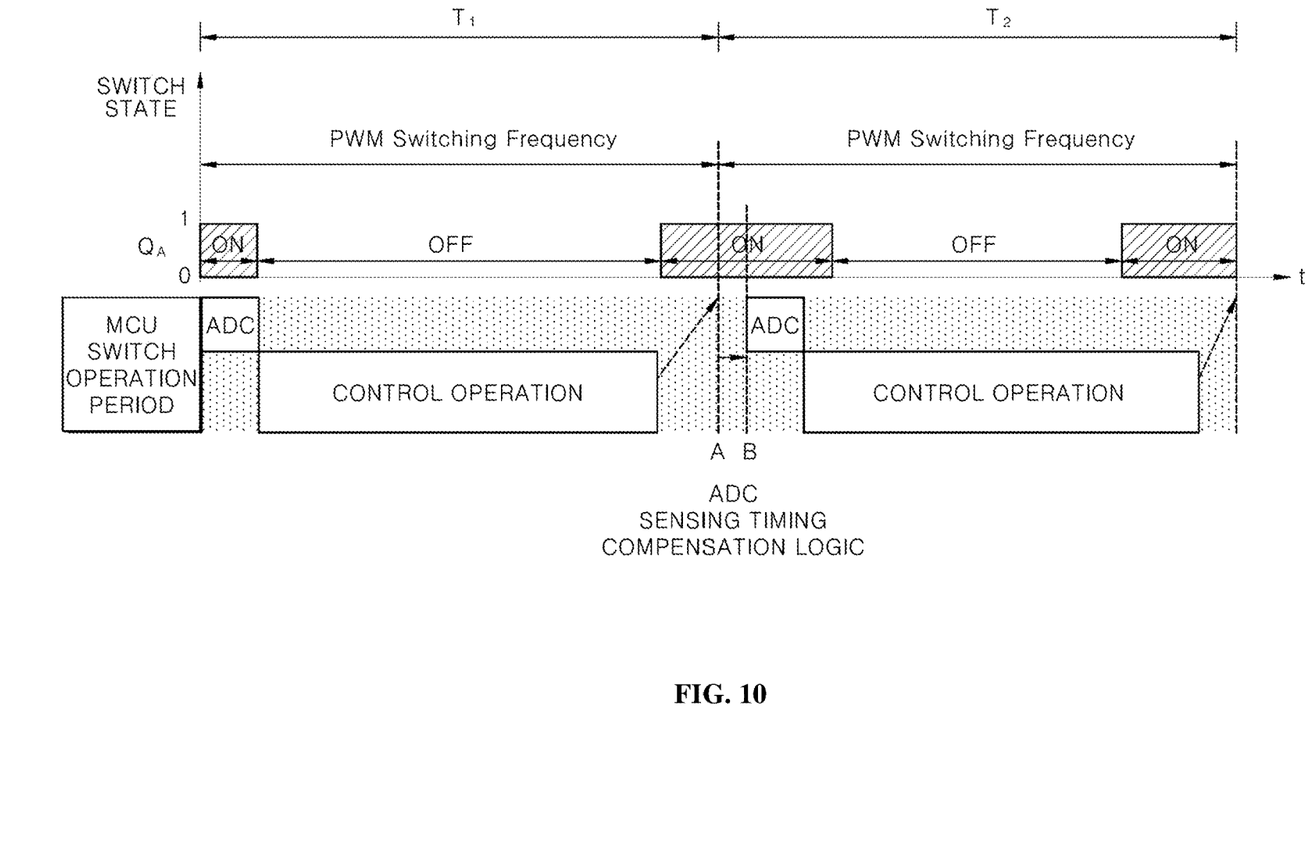
FIGS. 10 and 11 are timing charts for illustrating a compensation operation of the apparatus and method for controlling the PWM switching frequency of FIG. 8.
Figure 11:
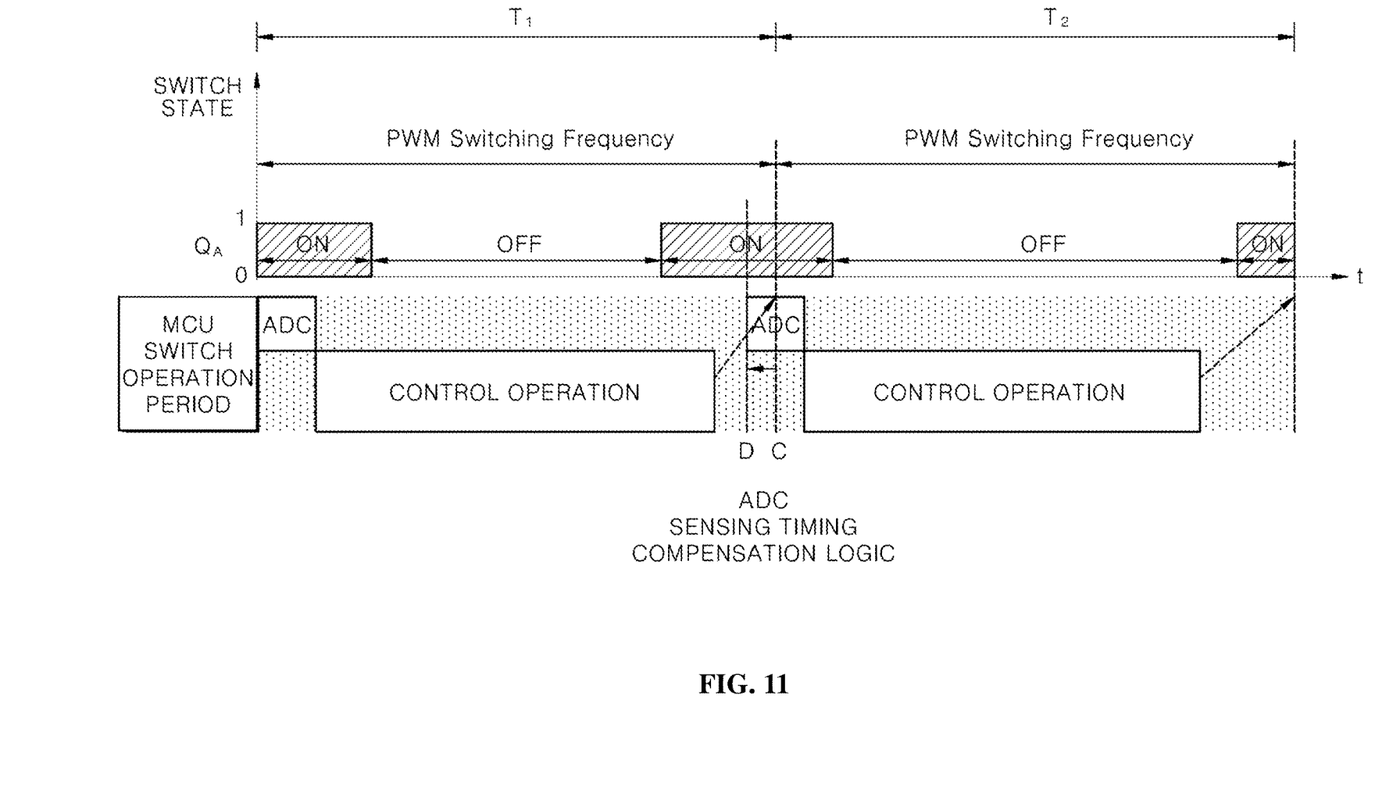

FIG. 8 is a flowchart for illustrating a method for controlling PWM switching frequency according to some exemplary embodiments of the present disclosure. FIG. 9 is a timing chart for illustrating negate PWM operation of the apparatus and method for controlling PWM switching frequency of FIG. 8. FIGS. 10 and 11 are timing charts for illustrating a compensation operation of the apparatus and method for controlling the PWM switching frequency of FIG. 8.

Referring to FIG. 8, the method for controlling PWM switching frequency according to some exemplary embodiments of the present disclosure employs the negate PWM scheme to control a switching signal $Q_A$.

Initially, in an on-duty period of the switching signal $Q_A$, the controller 300 receives an analog current value measured by the current sensor 133 and performs an ADC sensing process of converting the analog current value into a digital signal (step S110).

Subsequently, the controller 300 performs a control operation for calculating the duty ratio of the switching signal $Q_A$ to be applied to the transistor 131 based on the converted digital signal (step S120). Specifically, the controller 300 calculates the duty ratio of the switching signal $Q_A$ for high-speed switching in the control operation, and calculates a variation of the duty ratio based on the difference from the previous duty ratio.

Subsequently, the controller 300 changes the duty ratio or frequency of the switching signal $Q_A$ using the negative PWM scheme (step S130).

Specifically, referring to FIG. 9, in the on-duty period of the switching signal $Q_A$, the controller 300 updates the duty ratio of the switching signal $Q_A$ by reflecting the variation of the duty ratio calculated above. The timing of updating the duty ratio of the switching signal $Q_A$ may be the center of the on-duty period.

Unlike the existing apparatus that changes the duty ratio of the switching signal $Q_A$ in the off-duty period, the controller 300 according to an exemplary embodiment of the present disclosure employs the negative PWM scheme such that it changes the duty ratio of the switching signal $Q_A$ in the on-duty period. In addition, the controller 300 may change the frequency of the switching signal $Q_A$ as well as the duty ratio.

In conclusion, by employing the Negate PWM scheme, it is possible to overcome the problem of the existing apparatus that the control operation is completed late such that the calculation result is reflected after one cycle, resulting in poor control responsiveness to the PFC converter. In contrast, the apparatus and method for controlling PWM switching frequency employing the Negate PWM scheme can sufficiently utilize the control operation within the switching frequency, thereby increasing the control responsiveness of the system. In addition, since a high PWM switching frequency can be achieves, the capacity of the inductor and the capacitor included in the PFC converter 100 can be reduced. Accordingly, the overall area of the PFC converter 100 can be reduced.

It is, however, to be noted that when the negate PWM scheme is employed, the timing of ADC sensing may vary depending on the duty modulation. In this regard, according to an exemplary embodiment of the present disclosure, in order to regulate the timing of ADC sensing despite the duty modulation, a compensation logic for the timing of the ADC sensing is carried out. Hereinafter, the operation of the compensation logic at the timing of ADC sensing will be described with reference to FIGS. 8, 10 and 11.

Subsequent to the above-described step S130, the controller 300 determines whether the duty ratio of the switching signal $Q_A$ has been modulated (step S140).

If the duty ratio of the switching signal $Q_A$ has been modulated, it is determined whether a variation of the duty ratio to be modulated exceeds the control cycle of the control operation, and limits the variation of the duty ratio of the switching signal $Q_A$ (step S150).

Subsequently, it is determined whether a newly calculated duty ratio Duty_New of the switching signal $Q_A$ is greater than the duty ratio Duty_Old of the switching signal $Q_A$ of the previous cycle (step S160).

Subsequently, if the newly calculated duty ratio Duty_New is greater than the duty ratio Duty_Old of the previous cycle, a plus (+) compensation logic for retarding the current measurement timing by the current sensor 133 included in the PFC converter 100 is performed (step S170).

For example, as shown in FIG. 10, the duty ratio Duty_Old of a first cycle T1 of the switching signal $Q_A$ is compared to the duty ratio Duty_New of a second cycle T2 next to the first period T1, for example. If the duty ratio Duty_Old of the first cycle T1 is smaller than the duty ratio Duty_New of the second cycle, the controller 300 may retard the timing of measuring the current by the controller 300.

The plus (+) compensation logic of the controller 300 is calculated based on Equation 1 below:

$$\text{Duty\_Old} \langle = \text{Duty\_New}: Y_n = Y_{n-1} + \left(\frac{X}{4} - \frac{X_{n-1}}{4}\right) \qquad (1)$$

where Yn denotes a trigger timing of ADC sensing reflected in the next cycle, Yn−1 denotes a trigger timing of ADC sensing in the previous cycle, Xn denotes a duty ratio Duty_Old of the switching signal $Q_A$ to be reflected in the next period, and Xn−1 is the duty ratio Duty_New of the switching signal $Q_A$ of the previous cycle.

On the other hand, if the newly calculated duty ratio Duty_New is smaller than the duty ratio Duty_Old of the previous cycle, a minus (−) compensation logic for advancing the current measurement timing by the current sensor 133 included in the PFC converter 100 is performed (step S175).

For example, as shown in FIG. 11, the duty ratio Duty_Old of a first cycle T1 of the switching signal $Q_A$ is compared to the duty ratio Duty_New of a second cycle T2 next to the first period T1, for example. If the duty ratio Duty_Old of the first cycle T1 is greater than the duty ratio Duty_New of the second cycle, the controller 300 may advance the timing of measuring the current by the controller 300.

The minus (−) compensation logic of the controller 300 is calculated based on Equation 2 below:

$$\text{Duty\_Old} \rangle \text{Duty\_New}: Y_n = Y_{n-1} - \left(\frac{X_n}{4} - \frac{X_{n-1}}{4}\right) \qquad (2)$$

where Yn denotes a trigger timing of ADC sensing reflected in the next cycle, Yn−1 denotes a trigger timing of ADC sensing in the previous cycle, Xn denotes a duty ratio Duty_Old of the switching signal $Q_4$ to be reflected in the next period, and Xn−1 is the duty ratio Duty_New of the switching signal $Q_4$ of the previous cycle.

If the newly calculated duty ratio Duty_New is equal to the duty ratio Duty_Old of the previous cycle, the duty ratio of the switching signal $Q_4$ has not been modulated, stress thus it is maintained.

The above-described steps S110 to S175 may be performed every cycle of the PWM switching frequency.

In this manner, according to an exemplary embodiment of the present disclosure, by using the CT sensor as the current sensor of the PFC converter, it is possible to reduce the production cost. In addition, the high PWM switching frequency can be achieved, so that the capacity of the inductor and the capacitor can be reduced, thereby reducing the overall area of the circuit. Also, by employing the Negate PWM scheme, it is possible to achieve a system having high control characteristics with high control responsiveness, thereby improving the system operation efficiency.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. An apparatus for controlling Pulse Width Modulation (PWM) switching frequency, comprising:
   a power factor correction (PFC) converter configured to convert an AC voltage into a DC voltage, the converter comprising a transistor controlling an operation of the PFC converter and a current sensor connected in series with the transistor for measuring an electric current flowing through the transistor; and
   a controller configured to receive an output at the center of an on-duty period of a switching signal of a previous cycle from the current sensor and calculate a duty ratio of a switching signal of a next cycle,
   wherein the controller applies the calculated duty ratio to the switching signal of the next cycle at the center of in an on-duty period of the switching signal of the next cycle,
   wherein the controller:
   receives an analog current value measured by the current sensor at the center of the on-duty period of the switching signal of the previous cycle,
   converts the analog current value into a digital signal to then calculate a variation of the duty ratio between the switching signal of the previous cycle and the switching signal of the next cycle based on the converted digital signal, and
   retards or advances timing of measuring the current by the current sensor based on the variation of the duty ratio such that the retarded or advanced timing of measuring the current becomes the center of an on-duty period of the switching signal of the next cycle.

2. The apparatus of claim 1,
   wherein the PFC converter comprises a rectifier stage to rectify an AC voltage by using a plurality of diodes; and
   a control circuit comprising a first capacitor connected in parallel to the rectifier stage, and an inductor connected in series to one side of the first capacitor, a diode and a second capacitor,
   wherein one end of the transistor is connected between the inductor and the diode, and another end of the transistor is connected to the second capacitor.

3. The apparatus of claim 2, further comprising:
   a DC-DC converter controlled by the controller, the DC-DC converter comprising a transformer for stepping up/down an output voltage applied to the second capacitor to output it to a secondary side.

4. The apparatus of claim 1, wherein a magnitude of a current measured by the current sensor increases in the on-duty ratio period of the switching signal.

5. The apparatus of claim 1, wherein the controller compares a duty ratio of a first cycle with a duty ratio of a second cycle subsequent to the first cycle of the switching signal, and retards the timing of measuring the current by the current sensor if the duty ratio of the first cycle is smaller than the duty ratio of the second cycle.

6. The apparatus of claim 5, wherein the controller advances the timing of measuring the current by the current sensor if the duty ratio of the first cycle is greater than the duty ratio of the second cycle.

7. A method for controlling Pulse Width Modulation (PWM) switching frequency, the method comprising:
   measuring an electric current flowing through a transistor through a current sensor connected in series with the transistor for controlling an operation of a PFC converter;
   receiving data on the measured current at the center of an on-duty period of a switching signal of a previous cycle to calculate a duty ratio of a switching signal of a next cycle based on the data; and
   applying the calculated duty ratio to the switching signal of the next cycle at the center of in an on-duty period of the switching signal of the next cycle,
   wherein the receiving data on the measured current at the center of an on-duty period of a switching signal of the previous cycle to calculate a duty ratio of the switching signal of the next cycle based on the data comprises:
   receiving an analog current value measured by the current sensor in at the center of the on-duty period of the switching signal of the previous cycle;
   converting the analog current value into a digital signal to then calculate a variation of the duty ratio between the switching signal of the previous cycle and the switching signal of the next cycle based on the converted digital signal; and \
   retarding or advancing timing of measuring the current by the current sensor based on the variation of the duty ratio such that the retarded or advanced timing of measuring the current becomes center of an on-duty period of the switching signal of the next cycle.

8. The method of claim 7,
   wherein the PFC converter comprises a rectifier stage to rectify an AC voltage by using a plurality of diodes; and
   a control circuit comprising a first capacitor connected in parallel to the rectifier stage, and an inductor connected in series to one side of the capacitor, a diode and a second capacitor, and
   wherein one end of the transistor is connected between the inductor and the diode, and another end of the transistor is connected to the second capacitor.

9. The method of claim 7, wherein a magnitude of a current measured by the current sensor increases in the on-duty ratio period of the switching signal.

10. The method of claim 7, further comprising: comparing a duty ratio of a first cycle with a duty ratio of a second cycle subsequent to the first cycle of the switching signal; and retarding the timing of measuring the current by the current sensor if the duty ratio of the first cycle is smaller than the duty ratio of the second cycle.

11. The method of claim 10, further comprising: advancing the timing of measuring the current by the current sensor if the duty ratio of the first cycle is greater than the duty ratio of the second cycle.

\* \* \* \* \*